United States Patent
Cartella et al.

(10) Patent No.: US 11,954,685 B2
(45) Date of Patent: Apr. 9, 2024

(54) METHOD, APPARATUS AND COMPUTER PROGRAM FOR SELECTING A SUBSET OF TRAINING TRANSACTIONS FROM A PLURALITY OF TRAINING TRANSACTIONS

(71) Applicant: Sony Corporation, Tokyo (JP)

(72) Inventors: Francesco Cartella, Stuttgart (DE); Gert Ceulemans, Stuttgart (DE); Orlando Anunciacao, Stuttgart (DE); Gabriel Armelin, Stuttgart (DE); Ales Novak, Stuttgart (DE); Cristian Traum, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 475 days.

(21) Appl. No.: 16/810,966

(22) Filed: Mar. 6, 2020

(65) Prior Publication Data
US 2020/0285895 A1 Sep. 10, 2020

(30) Foreign Application Priority Data
Mar. 7, 2019 (EP) .................................... 19161430

(51) Int. Cl.
*G06Q 20/40* (2012.01)
*G06F 18/214* (2023.01)
(Continued)

(52) U.S. Cl.
CPC ....... *G06Q 20/4016* (2013.01); *G06F 18/214* (2023.01); *G06F 18/23213* (2023.01);
(Continued)

(58) Field of Classification Search
CPC .... G06K 9/6256; G06N 20/00; G06Q 20/401; G06Q 20/4016
See application file for complete search history.

(56) References Cited

U.S. PATENT DOCUMENTS

| 7,788,195 B1 | 8/2010 | Subramanian et al. |
| 7,792,770 B1 | 9/2010 | Phoha et al. |
(Continued)

FOREIGN PATENT DOCUMENTS

CN 107688831 A 2/2018

*Primary Examiner* — Bennett M Sigmond
*Assistant Examiner* — Bhavin D Shah
(74) *Attorney, Agent, or Firm* — XSENSUS LLP

(57) ABSTRACT

Training a machine learning model includes selecting a subset of training transactions from a plurality of training transactions to be used for classifying transactions as either fraudulent or genuine, and classifying transactions as either fraudulent or genuine. Additionally, selecting the subset of training transactions includes clustering the plurality of training transactions into a plurality of clusters based on a similarity measure. Each training transaction includes an indication whether the training transaction is fraudulent or genuine. Further, selecting the subset of training transactions includes selecting a first proportion of the training transactions of a cluster of training transactions for the subset of training transactions if the cluster comprises at least one fraudulent training transaction, and selecting a second proportion of the training transactions of a cluster of training transactions for the subset of training transactions if the cluster is free of fraudulent training transactions.

11 Claims, 3 Drawing Sheets

(51) Int. Cl.
*G06F 18/23213* (2023.01)
*G06F 18/2413* (2023.01)
*G06N 20/00* (2019.01)
*H04L 9/40* (2022.01)

(52) U.S. Cl.
CPC ....... *G06F 18/24137* (2023.01); *G06N 20/00* (2019.01); *G06Q 20/401* (2013.01)

(56) References Cited

U.S. PATENT DOCUMENTS

| | | | |
|---|---|---|---|
| 10,482,466 B1* | 11/2019 | Walters | G06N 3/08 |
| 10,861,031 B2* | 12/2020 | Sullivan | G06N 20/00 |
| 10,916,333 B1* | 2/2021 | Yeturu | G06N 7/01 |
| 2002/0099649 A1* | 7/2002 | Lee | G06Q 40/06 |
| | | | 705/38 |
| 2014/0058763 A1 | 2/2014 | Zizzamia et al. | |
| 2017/0083920 A1* | 3/2017 | Zoldi | G06N 20/00 |
| 2018/0307741 A1 | 10/2018 | Kida | |

* cited by examiner

METHOD, APPARATUS AND COMPUTER PROGRAM FOR SELECTING A SUBSET OF TRAINING TRANSACTIONS FROM A PLURALITY OF TRAINING TRANSACTIONS

CROSS-REFERENCE TO RELATED APPLICATION

The present application claims priority to European Patent Application 19161430.4 filed by the European Patent Office on Mar. 7, 2019, the entire contents of which being incorporated herein by reference.

FIELD

The present disclosure generally relates to a training and use of a machine-learning model, the machine-learning model being suitable for a classification of transactions as either fraudulent or genuine.

BACKGROUND

Fraud Detection Systems are essential tools that organizations like banks, insurances and credit institutions use to protect themselves from fraudulent activities performed by malicious users. These systems usually work by automatically analyzing transaction logs and raising alarms whenever a transactional activity is deemed to be suspicious, according to a predefined logic. Traditional Fraud Detection Systems may implement the detection logic in a rule-based manner. In other words, conditions designed to target known fraud scenarios may be set a priori by the business (for instance on transaction amount, transaction frequency or payment location) and whenever these conditions are violated, a suspicious activity may be reported. The response to these alarms may depend on the business context and can be the rejection of the transaction or further investigation of the suspicious activities.

Other than requiring a deep understanding of fraud mechanisms that are often unknown and unpredictable, rule based systems might also be vulnerable and exposed to reverse engineering techniques. Using these techniques, malicious users might be able to infer the underlying detection logic and take targeted counteractions to induce the system to fail in reporting fraudulent transactions.

On the other hand, in the current digital era characterized by an exponentially-growing availability of data, cheap computing power and storage, Machine Learning and Artificial Intelligence techniques have been increasingly and successfully adopted at the core of many modern fraud detection systems, due to their effectiveness in automatically discovering fraud dynamics in the data and, more importantly, due to their capability to quickly adapt to new fraud patterns.

In practice, given a training set of historical transactions for which it is known whether they are fraudulent or not, machine-learning algorithms may be able to capture and model the complex relations between the attributes of the input transactions. The output may be a mathematical function that may be used to infer the propensity of future transactions to be fraud, according to the values of their attributes.

One of the main issues of machine learning algorithms applied to fraud detection is that, typically, fraudulent events are extremely rare if compared to genuine transactions. This heavy imbalance in historical data leads very often to models that are biased towards negative instances, as they are the big majority. As a consequence, in some cases, resulting models have the tendency to wrongly classify fraudulent transactions as genuine.

A simple approach is to artificially balance the historical data by retaining only a random sample of negative instances, such that the resulting training set is characterized by a desired predefined fraud rate (for instance 10:1, i.e., 10 genuine transactions for each fraud activity). Subsampling techniques are also often used to reduce the amount of training data, which, in turn, results to a faster training procedure. This may lead to subsets of training transactions that may be considered problematic in two ways. First, the fraud rate might commonly decided by using rules of thumb without any guarantee of correctness or meaningfulness. Second, as the negative instances are selected at random, it might not be possible to assure that representative instances are kept while redundant instances are excluded.

SUMMARY

It is an object of the present disclosure to provide a method, an apparatus and a computer program for providing a set of training transactions for training a machine-learning model to be used for classifying transactions as either fraudulent or genuine, which enable an improved accuracy in the classification.

Embodiments of the present disclosure may address these issues and may provide a subsampling procedure that aims to increase the amount of useful information retained in the reduced training set and, at the same time, reducing the number of data points used for learning.

Embodiments may use clustering techniques to detect groups of transactions characterized by similar features. From each group, (only) a representative set of transactions might be selected in a meaningful way, while redundant instances may be discarded. In this way, the machine-learning algorithm may use a reduced training set that contains a high variety of transaction types, which may provide highly discriminative information for an effective modeling.

Embodiments of the present disclosure provide a method for selecting a subset of training transactions from a plurality of training transactions for training a machine-learning model to be used for classifying transactions as either fraudulent or genuine. Each training transaction comprises an indication whether the training transaction is fraudulent or genuine. The method comprises clustering the plurality of training transactions into a plurality of clusters based on a similarity measure. The method comprises selecting a subset of training transactions from the plurality of training transactions by selecting a first proportion of the training transactions of a cluster of training transactions for the subset of training transactions if the cluster comprises at least one fraudulent training transaction, and selecting a second proportion of the training transactions of a cluster of training transactions for the subset of training transactions if the cluster is free of fraudulent training transactions. The second proportion is lower than the first proportion. The method comprises providing the selected subset of training transactions for training a machine-learning model.

In some embodiments of the present disclosure, the method for selecting a subset of training transactions comprises training the machine-learning model using the subset of training transactions. Embodiments of the present disclosure provide a machine-learning model that is trained according to the method. Embodiments of the present disclosure provide a method for classifying transactions as either fraudulent or genuine that uses the machine-learning model that is trained according to the method to classify the transaction as either fraudulent or genuine.

Embodiments of the present disclosure provide a computer program having a program code for performing at least one of the methods when the computer program is executed on a computer, a processor, or a programmable hardware component.

Embodiments of the present disclosure provide an apparatus comprising circuitry. The circuitry is configured to execute at least one of the methods.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
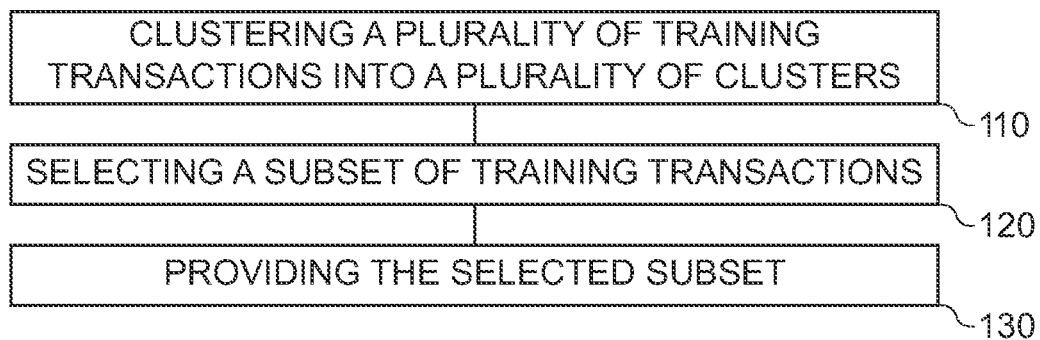
FIGS. 1a and 1b show flow charts of embodiments of a method for selecting a subset of training transactions from a plurality of training transactions.
Figure 1B:
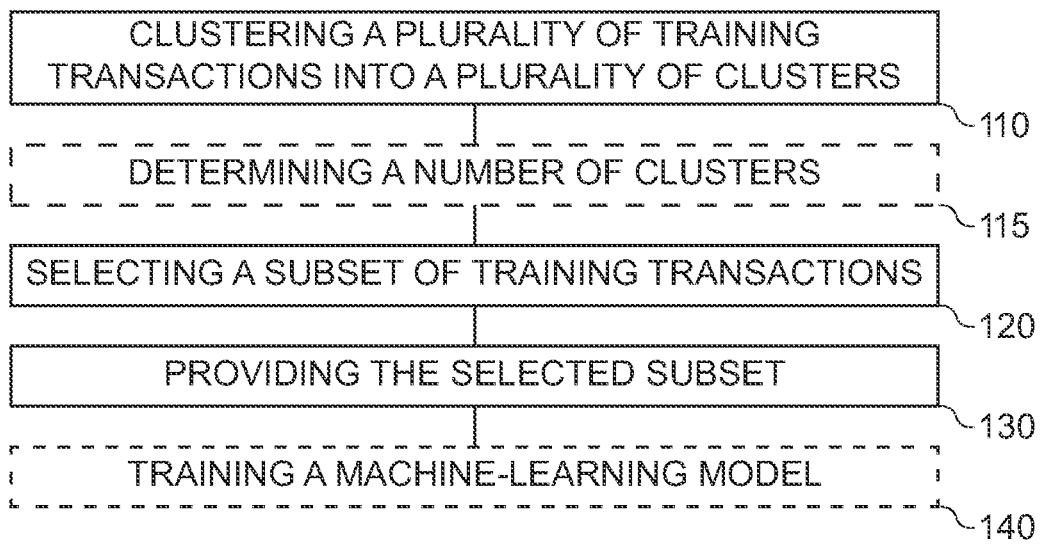

FIGS. 1a and 1b show flow charts of embodiments of a method for selecting a subset of training transactions from a plurality of training transactions for training a machine-learning model to be used for classifying transactions as either fraudulent or genuine. Each training transaction comprises an indication whether the training transaction is fraudulent or genuine. The method comprises clustering 110 the plurality of training transactions into a plurality of clusters based on a similarity measure. The method comprises selecting 120 a subset of training transactions from the plurality of training transactions by selecting a first proportion of the training transactions of a cluster of training transactions for the subset of training transactions if the cluster comprises at least one fraudulent training transaction, and selecting a second proportion of the training transactions of a cluster of training transactions for the subset of training transactions if the cluster is free of fraudulent training transactions. The second proportion is lower than the first proportion. The method comprises providing 130 the selected subset of training transactions for training a machine-learning model. For example, the method may be a computer-implemented method.

Figure 1C:
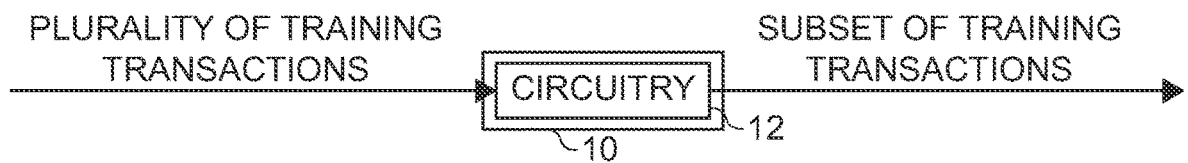
FIG. 1c shows a block diagram of an embodiment of an apparatus for selecting a subset of training transactions from a plurality of training transactions.

FIG. 1c shows a block diagram of an embodiment of a (corresponding) apparatus 10 for selecting a subset of training transactions from a plurality of training transactions or training a machine-learning model to be used for classifying transactions as either fraudulent or genuine. The apparatus 10 comprises a circuitry 12 that is configured to perform the method introduced in connection with FIGS. 1a and/or 1b.

The following description relates both to the method of FIGS. 1a and/or 1b and the apparatus 10.

At least some embodiments of the present disclosure relate to a method, apparatus or computer program for selecting a subset of training transactions from a plurality of training transactions for training a machine-learning model to be used for classifying transactions as either fraudulent or genuine. Institutions, such as banks, insurances or merchants, often process a huge number of transactions every day, such as financial transactions (which may be processed by a bank or by a merchant) or insurance transactions (which may be processed by insurances). Accordingly, the plurality of transactions may be financial transactions or insurance transactions. As the number of transactions is so high that a manual check of every transaction is not feasible, such institutions often use automated systems to classify the transactions as either fraudulent (i.e. suspicious, illicit) or genuine (i.e. unsuspicious, licit). In the following, the terms fraudulent, illicit and suspicious may be used interchangeably, and the terms genuine, licit and unsuspicious may be used interchangeably. In some systems, a rule-based classification may be used, e.g. by comparing certain metrics of the transactions to a rulebook that is used to decide whether the transaction is fraudulent or genuine. Such rulebooks may be based on experience, but might be susceptible to being reverse-engineered by malicious actors.

In some other systems, machine learning-based approaches may be used. One issue with using a machine learning-based approach is the training of the machine-learning model of the machine learning-based approach: If a historical set of transactions is used for training the machine-learning model, this training set is often mostly composed of genuine transactions, often comprising less than 1 fraudulent transaction per 100'000 transactions. If such a training set is used "as is", the resulting machine-learning model might be skewed toward classifying fraudulent transactions as genuine. Accordingly, a technique called "subsampling" may be used to select transactions from the plurality of training transactions. In embodiments, a sub-sampling may be used that is based on a clustering of the plurality of training transactions. In embodiments, the training transactions are clustered into a plurality of clusters. If a cluster includes at least one fraudulent training transaction (e.g. if it is a heterogeneous cluster comprising both fraudulent and genuine transactions or if it is a homogeneous clusters comprising only fraudulent training transactions), a first proportion (e.g. at least 80% or more, for example 100%) of the training transactions may be chosen, as these are the clusters of interest. If a clusters is a homogeneous cluster comprising only genuine training transactions, only a second proportion (e.g. a fixed value of 1 or 2) may be used that represent these clusters. By selecting the subset of training transactions based on the first and second proportions, the number of training transactions that are fraudulent and similar to fraudulent transactions may be retained, and the number of training transactions that are clearly genuine may be reduced, which enables an improved accuracy in the classification of a subsequently trained machine-learning model while requiring fewer training transactions, which may further reduce the amount of processing resources required for training the machine-learning model.

Embodiments are based on using a machine-learning model or machine-learning algorithm. Machine learning refers to algorithms and statistical models that computer systems may use to perform a specific task without using explicit instructions, instead relying on models and inference. For example, in machine-learning, instead of a rule-based transformation of data, a transformation of data may be used that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information (e.g., a desired output value), the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. In embodiments, such a transformation is used between the (training) transactions and the classification of the (training) transactions as genuine or fraudulent.

Machine-learning models are trained using training input data. The examples specified above use a training method called "supervised learning". In supervised learning, the machine-learning model is trained using a plurality of training samples, wherein each sample may comprise a plurality of input data values and a plurality of desired output values, i.e. each training sample includes a desired output value. By specifying training samples with desired output values, the machine-learning model "learns" which output value to provide based on an input sample that is similar to the samples provided during the training. In embodiments, the training transactions may comprise both the actual content of the training transactions to be used as input values, and the indication whether a training transaction is fraudulent or genuine to be used as desired output value. Supervised learning may be based on a supervised learning algorithm, e.g. a classification algorithm, a regression algorithm or a similarity learning algorithm. Classification algorithms may be used when the outputs are restricted to a limited set of values, i.e. the input is classified to one of the limited set of values. Regression algorithms may be used when the outputs may have any numerical value (within a range). Similarity learning algorithms are similar to both classification and regression algorithms, but are based on learning from examples using a similarity function that measures how similar or related two objects are. For example, in embodiments, a classification algorithm may be used to classify the training transaction to the output values of "fraudulent" or "genuine".

Each training transaction comprises an indication whether the training transaction is fraudulent or genuine. In other words, the plurality of training transactions may comprise an indication for each training transaction whether the training transaction is fraudulent or genuine. For example, each training transaction may comprise a binary value indicating whether the training transaction is fraudulent or genuine. In some embodiments, the plurality of training transactions may be stored in a database. The plurality of training transactions may each be stored in one or more fields of a row/entry in the database, and the indication whether the training transaction is fraudulent or genuine may be stored as a field in the row/entry, e.g. as binary value. Alternatively, the plurality of training transactions may each be provided as separate files, and the indication whether the training transaction is fraudulent or genuine may be provided within the same file or may be indicated as part of the file name of the file.

The method comprises clustering 110 the plurality of training transactions into a plurality of clusters based on a similarity measure. For example, the plurality of clusters may be disjoint, i.e. each transaction of the plurality of transactions may be comprised in exactly one cluster of the plurality of clusters. Apart from supervised learning, unsupervised learning may be used in machine learning. In unsupervised learning, (only) input data might be supplied, and an unsupervised learning algorithm may be used to find structure in the input data, e.g. by grouping or clustering the input data, finding commonalities in the data. Clustering is the assignment of input data comprising a plurality of input values into subsets (clusters) so that input values within the same cluster are similar according to one or more (predefined) similarity criteria or similarity measures, while being dissimilar to input values that are included in other clusters. For example, the plurality of training transactions may be clustered 110 using an unsupervised clustering technique (i.e. using unsupervised learning). This may enable a fast and automated clustering of the training transactions. In at least some embodiments, the indication whether a training transaction is fraudulent or genuine is disregarded in the clustering of the plurality of training transactions. Incorporating the training output may lead to less useful results, as no such information might be available in the subsequent classification of transactions.

In embodiments, the similarity measure may be defined by the unsupervised learning process. In many cases, the clustering of the plurality of training transactions is an iterative process, i.e. the plurality of training transactions may be processed one after another. Consequently, the similarity measure may develop during the clustering of the plurality of training transactions. For example, the similarity measure, and therefore the clustering, may be based on k-means clustering. k-means clustering aims to partition n observations (i.e. transactions) into k clusters (i.e. the plurality of clusters) in which each observation belongs to the cluster with the nearest mean, serving as a prototype of the cluster. In this case, the similarity measure may be defined by the distance of the training transactions of the plurality of training transactions to a mean of the clusters of the plurality of clusters. Alternatively, the similarity measure, and therefore the clustering, may be based on hierarchical clustering. Hierarchical clustering is a method of cluster analysis that seeks to build a hierarchy of clusters. In hierarchical clustering, the plurality of transactions are either clustered using a "bottom-up" (agglomerative) approach, in which each transactions starts in its own cluster, and pairs of clusters are merged as the training algorithm moves up the hierarchy, or a "top-down" (divisive) approach, where all transactions start in one cluster, and splits are performed recursively as the training algorithm moves down the hierarchy. In this case, the similarity measure may be the measure that is used to define when pairs of clusters are merged (bottom-up approach) or that is used to define when a cluster is split (top-down approach). Both similarity measures may be used to implement the clustering of the training transactions.

In at least some embodiments, the clustering of the plurality of training transactions is performed using a (pre-defined) number of clusters. For example, the pre-defined number of clusters may be used as a parameter in the clustering of the plurality of training transactions. This number of clusters generated in the clustering of the plurality of training transactions may depend on the plurality of training transactions. In other words, as shown in FIG. 1b, the method may comprise determining 115 the number of clusters to be used in the clustering of the plurality of training transactions based on the plurality of training transactions. By determining the number of clusters, the variety of the retained information may be increased. For example, the number of clusters may be determined, e.g. before the clustering is performed, or by performing the clustering using different numbers of clusters and choosing the number of clusters that has improved properties compared to the other numbers of clusters.

For example, the number of clusters to be used in the clustering of the plurality of training transactions may be determined 115 using an iterative process that is performed over a range of numbers of clusters. For example, the clustering of the plurality of training transactions may be performed based on a plurality of different numbers of numbers of clusters comprised in the range of numbers of clusters. For example, the range of numbers of clusters may be set to 3 to 20 clusters. The clustering may be performed using the numbers comprised in the range of numbers of clusters (e.g. 3, 4, 5 . . . 20) as parameters, resulting in a plurality of results each comprising a plurality of clusters. For example, the range of numbers of clusters may comprise at least 3 (or at least 5) clusters and/or at most 30 (or at most 25, at most 20) clusters. The determining of the number of clusters may comprise evaluating the plurality of results, e.g. by comparing at least one property of the plurality clusters of the plurality of results. For example, the number of clusters to be used in the clustering of the plurality of training transactions may be determined 115 based on a trade-off between intra-cluster variance and inter-cluster variance of the clustering of the plurality of training transactions. Accordingly, the at least one property of the clusters to be compared may comprise the inter-cluster variance and/or the intra-cluster variance. After evaluating the plurality of results, the method may comprise selecting the result and the associated number of clusters for which the at least one property is improved compared to other results of the plurality of results. The selected result may yield the plurality of clusters that may be used in the selection of the subset of training transactions.

The method comprises selecting 120 the subset of training transactions from the plurality of training transactions. For example, in the selection 120 of the subset of training transactions, the plurality of training transactions may be reduced to the subset of training transactions. In other words, training transactions that are omitted from the subset of training transactions may be discarded.

A first proportion of the training transactions of a cluster of training transactions is selected for the subset of training transactions if the cluster comprises at least one fraudulent training transaction. For example, at least 80% (or at least 85%, at least 90%) of the training transactions of a cluster of training transactions may be selected for the subset of training transactions if the cluster comprises at least one fraudulent training transaction. In some embodiments, all of the training transactions of a cluster of training transactions may be selected for the subset of training transactions if the cluster comprises at least one fraudulent training transaction. By keeping a high proportion of training transactions of clusters that comprise at least one fraudulent training transaction, the training transactions that are similar to fraudulent training transactions may be kept.

If less than all training transactions of a cluster that comprises at least one fraudulent training transaction are selected, the training transactions that are selected 120 for the subset of training transactions may be selected based on a proximity of said training transactions to a centroid of the respective cluster and/or based on whether they are fraudulent. For example, all of the fraudulent training transactions may be included in the subset of training transactions, and the genuine transactions may be selected based on the proximity of said training transactions to a centroid of the respective cluster. The centroid or barycenter of a cluster may be defined as an arithmetic or computational mean of (all of) the members (i.e. transactions) of a cluster, e.g. based on a numerical representation of the training transactions within a cluster. This may enable a selection of training selections that are characteristic for the cluster.

The second proportion of the training transactions of a cluster of training transactions is selected for the subset of training transactions if the cluster is free of fraudulent training transactions. The second proportion is lower than the first proportion. For example, less than 50% (or less than 40%, less than 30%, less than 20%, less than 10%) of the training transactions of a cluster of training transactions might be selected for the subset of training transactions if the cluster is free of fraudulent training transactions. In at least some embodiments, a fixed number of training transactions of a cluster of training transactions are selected for the subset of training transactions if the cluster is free of fraudulent training transactions. This may enable a straightforward selection of training selections. For example, 1, 2, 5 or 10 training transactions of a cluster of training transactions may be selected for the subset of training transactions if the cluster is free of fraudulent training transactions. The training transactions that are selected 120 for the subset of training transactions may be selected based on a proximity of said training transactions to a centroid of the respective cluster if the cluster is free of fraudulent training transactions, e.g. by selecting training transactions of the cluster that are closer to the centroid or barycenter of the cluster than other training transactions of the cluster of training transactions. This may enable a selection of training selections that are characteristic for the cluster. As the plurality of training transactions might comprise a high number of training transactions, e.g. more than 100 000 or more than 1 000 000 training transactions, and the number of clusters might be below 50, selecting only a low, fixed number of training transactions may lead to the second proportion being low proportion. In embodiments, the proportion of training transactions selected from a cluster for the subset of training transactions may be defined as a ratio of a number of selected training transactions to a total number of training transactions of a cluster.

The method comprises providing 130 the selected subset of training transactions for training a machine-learning model. For example, the providing 130 of the selected subset of training transactions for training the machine-learning model may comprise discarding training transactions of the plurality of training transactions that are omitted from the subset of training transactions. For example, the providing 130 of the selected subset of training transactions for training the machine-learning model may comprise providing the selected subset of training transactions as a package, e.g. as a folder, as a database or as a compressed package, without training transactions of the plurality of training transactions that are omitted from the subset of training transactions. For example, if the plurality of training transactions are stored in a database, the training transactions of the plurality of training transactions that are omitted from the subset of training transactions may be tagged as discarded or may be deleted from the database. If the plurality of training transactions are stored in separate files, the files associated with the training transactions of the plurality of training transactions that are omitted from the subset of training transactions may be deleted or moved to a separate folder.

In some embodiments, as shown in FIG. 1b, the method may comprise training 140 the machine-learning model using (only) the subset of training transactions. Using the trained machine-learning model, the classification of the transactions may be performed. For example, the machine-learning model may be trained using supervised learning. For example, the subset of training transactions may be used as training samples of the supervised learning, and the indication whether the training transactions are fraudulent or genuine comprised in the training transactions may be used as desired output of the supervised learning. For example, the machine-learning model may be trained without using the training transactions of the plurality of training transactions that are omitted from the subset of training transactions. In some embodiments, the machine-learning model may be trained based on a classification algorithm. For example, the subset of training transactions may be used as training samples, and the indication whether the training transactions are fraudulent or genuine comprised in the training transactions may be used as the limited set of values that is used as the training output. Alternatively, the machine-learning model may be trained based on a regression algorithm. In this case, the subset of training transactions may be used as training samples, and the indication whether the training transactions are fraudulent or genuine comprised in the training transactions may define two numerical values that are used as training output. Alternatively, the machine-learning model may be trained based on a similarity learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine. Support vector machines (i.e. support vector networks) are supervised learning models with associated learning algorithms that may be used to analyze data, e.g. in classification or regression analysis. Support vector machines may be trained by providing an input with a plurality of training input values (samples) that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

Machine-learning algorithms are usually based on a machine-learning model. In other words, the term "machine-learning algorithm" may denote a set of instructions that may be used to create, train or use a machine-learning model. In embodiments, classification algorithms such as deep learning, extreme gradient boosting, support vector machines, or decision trees may be used to train the machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

The circuitry 12 may comprise processing circuitry and interface circuitry. The circuitry 12, e.g. the processing circuitry, may be implemented using one or more processing units, one or more processing devices, any means for processing, such as a processor, a computer or a programmable hardware component being operable with accordingly adapted software. In other words, the described function of the processing circuitry may as well be implemented in software, which is then executed on one or more programmable hardware components. Such hardware components may comprise a general-purpose processor, a Digital Signal Processor (DSP), a micro-controller, etc. The interface circuitry may correspond to one or more inputs and/or outputs for receiving and/or transmitting information, which may be in digital (bit) values according to a specified code, within a module, between modules or between modules of different entities.

More details and aspects of the method and/or apparatus 10 are mentioned in connection with the proposed concept or one or more examples described above or below (e.g. FIGS. 2 to 3). The method and/or apparatus 10 may comprise one or more additional optional features corresponding to one or more aspects of the proposed concept or one or more examples described above or below.

Figure 2:
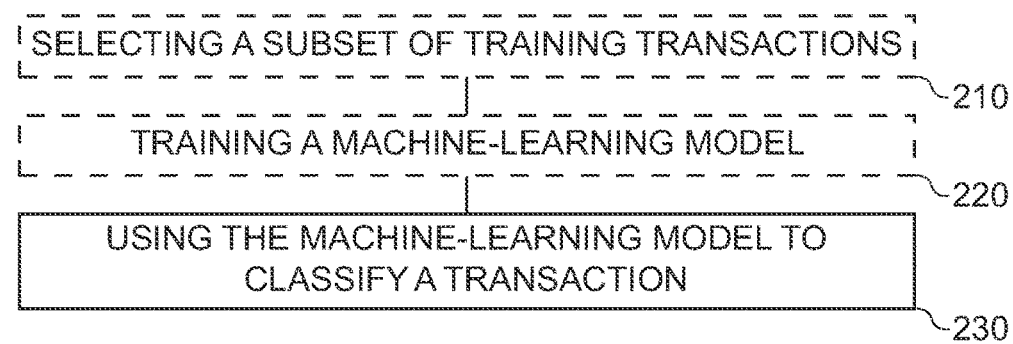
FIG. 2 shows a flow chart of an embodiment of a method for classifying transactions as either fraudulent or genuine.

FIG. 2 shows a flow chart of an embodiment of a method for classifying transactions as either fraudulent or genuine. The method comprises using 230 a machine-learning model that is trained according to the method of FIGS. 1a/and or 1b to classify the transaction as either fraudulent or genuine. For example, the machine-learning model may be trained based on a classification algorithm. The transaction may be provided as an input to the machine-learning model, and the output of the machine-learning model may indicate whether the transaction is classified as fraudulent or genuine. Alternatively, the machine-learning model may be trained based on a regression algorithm. The transaction may be provided as an input to the machine-learning model, and the output of the machine-learning model may provide a numerical value that represents a probability that the transaction is fraudulent (or genuine). Alternatively, the machine-learning model may be trained based on a similarity learning algorithm. The transaction may be provided as an input to the machine-learning model, and the output of the machine-learning model may indicate a similarity between the provided transactions and fraudulent (training) transactions and/or genuine (training) transactions that the machine-learning model is trained on.

After classification of the transaction as either fraudulent or genuine, the method may comprise providing the classification. For example, the classification may be provided as an entry in a transaction log, or as warning signal (e.g. if the transaction is classified as fraudulent). For example, in some embodiments, the classification might only be provided if the transaction is classified as fraudulent.

In some embodiments, as shown in FIG. 2, the method may further comprise selecting 210 a subset of training transactions from a plurality of training transactions. The method may further comprise training 220 the machine-learning model using the subset of training transactions. Both the selection and the training may be implemented similar to the respective features 110-140 introduced in connection with FIGS. 1a and/or 1b.

More details and aspects of the method are mentioned in connection with the proposed concept or one or more examples described above or below (e.g. FIG. 1a to 1c, 3). The method may comprise one or more additional optional features corresponding to one or more aspects of the proposed concept or one or more examples described above or below.

At least some embodiments of the present disclosure relate to a cluster-based subsampling for fraud detection.

At least some embodiments are based on the insight that very similar transactions are often redundant and thus often do not provide any extra useful information to the training algorithm. On the other hand, as these redundant transactions are part of the training set, they are considered in the training procedure, causing the learning algorithm to slow down considerably. As such, if a similarity measure is defined for each pair of transactions, redundant instances can be easily identified and excluded.

Clustering algorithms are unsupervised learning techniques that have been extensively used to discover similarity patterns and underlying relations between entities, based only on their features. Embodiments may use these techniques to identify redundant transactions that can be discarded, without reducing drastically the information amount that a learning algorithm can use on a reduced training set.

Figure 3:
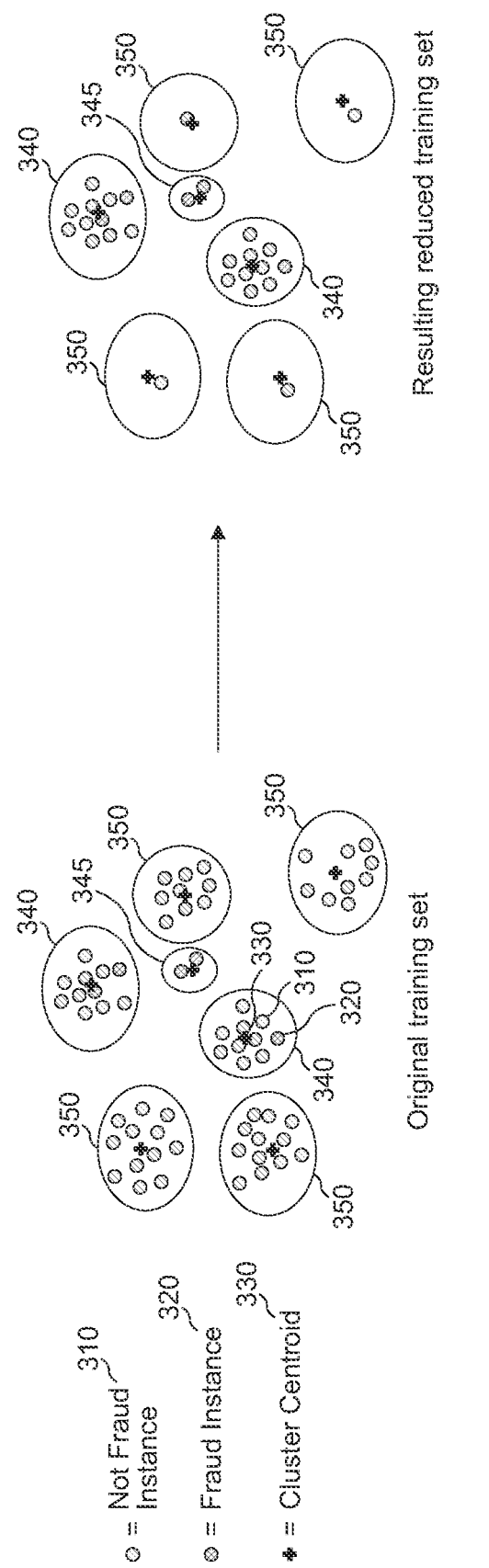
FIG. 3 shows a schematic diagram of a clustering-based subsampling procedure.

The procedure of the proposed subsampling methodology according to at least some embodiments is illustrated in FIG. 3. FIG. 3 shows a schematic diagram of a clustering-based subsampling procedure. In FIG. 3 transactions that are not fraud (i.e. genuine) are denoted with reference sign 310, fraud instances are denoted with reference sign 320 and the cluster centroid is denoted with reference sign. Reference sign 340 denotes clusters that comprise both fraudulent and genuine transactions, reference sign 345 denotes clusters that comprise only fraudulent (training) transactions, and reference sign 350 denotes clusters that comprise only genuine (training) transactions. The left side of FIG. 3 shows the original training set (e.g. the plurality of training transactions), and the right side of FIG. 3 shows the resulting reduced training set (e.g. the subset of training transactions). The procedure may comprise at least some of the following steps:

1. Cluster the entire training set (e.g. the plurality of training transactions) in an unsupervised way (without considering the label of each transaction). At this purpose, standard clustering techniques, like k-means or hierarchical clustering may be used.
2. Determine the number of clusters to be used (e.g. the "optimal" number of clusters) by using standard fitting measures (for instance inter and intra clusters variance tradeoff). This procedure may provide or assure that the variety of the retained information is increased or maximized. For example, the number of clusters may be chosen such that inter-cluster variance is increased or maximized and intra-cluster variance is decreased or minimized (or another strategy to select an optimal number of clusters).
3. For clusters having at least one fraud instance, e.g. clusters 340 and 345, keep all the training transactions (within the cluster), e.g. the first proportion of transactions. Usually, the training transactions belonging to heterogeneous groups (clusters having both fraud and not fraud (i.e. genuine) activities) may be the most difficult to classify because of the subtle differences between frauds and not frauds attributes. By retaining all the training transactions within these clusters, the training algorithm may effectively and finely model the information useful to discriminate fraud instances that are very similar to genuine transactions.
4. For homogeneous clusters having only not fraud instances, e.g. clusters 350, retain (only) the (top N) transactions closest/closer to the cluster centroid. The remaining transactions can be considered as redundant and can be excluded from the training set (e.g. the subset of training transactions). Usually, homogenous clusters containing only negative instances represent transactions having features that are easily distinguishable as not fraud. By retaining only representative instances, the training algorithm may effectively model these cases using a minimum amount of data points.

Typically, fraud detection tasks are highly imbalanced problems, for which negative samples are in big majority compared to fraudulent activities. As such, the procedure described above may lead to an extensive reduction of the problem complexity, since a big portion of the majority class of redundant genuine transactions may be excluded.

This methodology can be used if deployed as a software library, offering APIs (Application Programming Interfaces) for many commonly used programming languages and statistical toolboxes (i.e., Python, R, Java, etc.). Embodiments may provide such a library, to be made available to data scientists and analysts as part of data preprocessing pipeline prior to the model training.

Embodiments may provide a software library used to down-sample training data particularly for data driven fraud detection use cases, e.g. a computer program implementing the method introduced in connection with FIGS. 1a and/or 1b. Libraries APIs for commonly used programming language and statistical toolboxes may be implemented. Embodiments may provide the option of specifying 1. A clustering algorithm (i.e., k-means or hierarchical clustering)
2. A metric to evaluate and select the optimal number of clusters
3. The number N of instances to be kept within each homogeneous cluster to be down sampled The parameters above may be set by the user who may obtain the freedom to tune and select the optimal values for his specific problem. Embodiments may provide an informed down sampling methodology that ultimately reduces the training time and, as it might remove only redundant observations, keep a high level of discriminative information in the training set to produce an effective classification model.

More details and aspects of the concept and methodology are mentioned in connection with the proposed concept or one or more examples described above or below (e.g. FIG. 1a to 2).

The concept and methodology may comprise one or more additional optional features corresponding to one or more aspects of the proposed concept or one or more examples described above or below.

The following examples pertain to further embodiments:

(1) Method for selecting a subset of training transactions from a plurality of training transactions for training a machine-learning model to be used for classifying transactions as either fraudulent or genuine, each training transaction comprising an indication whether the training transaction is fraudulent or genuine, the method comprising:
Clustering the plurality of training transactions into a plurality of clusters based on a similarity measure;
Selecting a subset of training transactions from the plurality of training transactions by:
selecting a first proportion of the training transactions of a cluster of training transactions for the subset of training transactions if the cluster comprises at least one fraudulent training transaction, and
selecting a second proportion of the training transactions of a cluster of training transactions for the subset of training transactions if the cluster is free of fraudulent training transactions, the second proportion being lower than the first proportion; and
Providing the selected subset of training transactions for training a machine-learning model.

(2) The method according to (1), wherein at least 80% of the training transactions of a cluster of training transactions are selected for the subset of training transactions if the cluster comprises at least one fraudulent training transaction.

(3) The method according to one of (1) or (2), wherein all of the training transactions of a cluster of training transactions are selected for the subset of training transactions if the cluster comprises at least one fraudulent training transaction.

(4) The method according to one of (1) to (3), wherein a fixed number of training transactions of a cluster of training transactions are selected for the subset of training transactions if the cluster is free of fraudulent training transactions.

(5) The method according to one of the (1) to (4), wherein the training transactions that are selected for the subset of training transactions are selected based on a proximity of said training transactions to a centroid of the respective cluster if the cluster is free of fraudulent training transactions.

(6) The method according to one of (1) to (5), wherein the plurality of training transactions are clustered using an unsupervised clustering technique.

(7) The method according to one of (1) to (6), wherein the similarity measure is based on k-means clustering and/or based on hierarchical clustering.

(8) The method according to one of (1) to (7), wherein a number of clusters generated in the clustering of the plurality of training transactions depends on the plurality of training transactions, the method comprising determining the number of clusters to be used in the clustering of the plurality of training transactions based on the plurality of training transactions.

(9) The method according to (8), wherein the number of clusters to be used in the clustering of the plurality of training transactions is determined using an iterative process that is performed over a range of numbers of clusters.

(10) The method according to one of (8) or (9), wherein the number of clusters to be used in the clustering of the plurality of training transactions is determined based on a trade-off between intra-cluster variance and inter-cluster variance of the clustering of the plurality of training transactions.

(11) The method according to one of (1) to (10), wherein the indication whether a training transaction is fraudulent or genuine is disregarded in the clustering of the plurality of training transactions.

(12) The method according to one of (1) to (11), wherein the plurality of training transactions are financial transactions.

(13) The method according to one of (1) to (12), further comprising training the machine-learning model using the subset of training transactions.

(14) A method for classifying transactions as either fraudulent or genuine, the method comprising using a machine-learning model that is trained according (13) to classify the transactions as either fraudulent or genuine.

(15) A computer program having a program code for performing at least one of the methods according to one of the previous examples, when the computer program is executed on a computer, a processor, or a programmable hardware component.

(16) A machine-learning model that is trained according to the method of (13).

(17) An apparatus for selecting a subset of training transactions from a plurality of training transactions for training a machine-learning model to be used for classifying transactions as either fraudulent or genuine, each training transaction comprising an indication whether the training transaction is fraudulent or genuine, the apparatus comprising:

Circuitry configured to:

Cluster the plurality of training transactions into a plurality of clusters based on a similarity measure, Select a subset of training transactions from the plurality of training transactions by:

selecting a first proportion of the training transactions of a cluster of training transactions for the subset of training transactions if the cluster comprises at least one fraudulent training transaction, and selecting a second proportion of the training transactions of a cluster of training transactions for the subset of training transactions if the cluster is free of fraudulent training transactions, the second proportion being lower than the first proportion, and Provide the selected subset of training transactions for training a machine-learning model.

(18) An apparatus for classifying transactions as either fraudulent or genuine, the apparatus comprising circuitry being configured to use a machine-learning model that is trained according (13) to classify the transactions as either fraudulent or genuine.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method, comprising:

selecting a subset of training transactions from a plurality of training transactions, wherein each training transaction comprises an indication whether the training transaction is fraudulent or genuine, the selected subset of training transactions being used for training a machine-learning model, the machine-leaning model being used for classifying transactions as either fraudulent or genuine, wherein selecting a subset of training transactions includes clustering, by processing circuitry, the plurality of training transactions into a plurality of clusters based on a similarity measure;

determining, by the processing circuitry, the number of clusters to be used in the clustering of the plurality of training transactions based on the plurality of training transactions, wherein the number of clusters to be used in the clustering of the plurality of training transactions is determined by using an iterative process that is performed over a range of numbers of clusters resulting in a plurality of results each comprising a plurality of clusters;

comparing at least one property of the plurality of clusters of the plurality of results, wherein the number of clusters to be used is based on a trade-off between intra-cluster variance and inter-cluster variance of the clustering of the plurality of training transactions; and selecting a result and the associated number of clusters for which the at least one property is improved compared to other results of the plurality of results;

selecting, by the processing circuitry, a subset of training transactions from the plurality of training transactions, wherein the method for selecting the subset of training transactions includes selecting a first proportion of the training transactions of a cluster of training transactions for the subset of training transactions in response to the cluster including at least one fraudulent training transaction; and selecting a second proportion of the training transactions of a cluster of training transactions for the subset of training transactions in response to the cluster being free of fraudulent training transactions, the second proportion being less than the first proportion, wherein the training transactions that are selected for the second proportion of the subset of training transactions are selected based on a proximity of said training transactions to a centroid of the respective cluster;

providing, by the processing circuitry, the selected subset of training transactions for training a machine-learning model, wherein the selected subset of training transactions improves accuracy in classifying transactions as either fraudulent or genuine, increases the amount of useful information and reduces the number of data points used for training, and provides a reduced training set that contains a high variety of transaction types that leads to highly discriminative information for effective modeling; and operating a fraud detection system using the trained machine-learning model to classify a transaction as either fraudulent or genuine.

2. The method according to claim 1, wherein at least 80% of the training transactions of a cluster of training transactions are selected for the subset of training transactions if the cluster comprises at least one fraudulent training transaction.

3. The method according to claim 1, wherein all of the training transactions of a cluster of training transactions are selected for the subset of training transactions if the cluster comprises at least one fraudulent training transaction.

4. The method according to claim 1, wherein a fixed number of training transactions of a cluster of training transactions are selected for the subset of training transactions if the cluster is free of fraudulent training transactions.

5. The method according to claim 1, wherein the plurality of training transactions are clustered using an unsupervised clustering technique.

6. The method according to claim 1, wherein the similarity measure is based on k-means clustering and/or based on hierarchical clustering.

7. The method according to claim 1, wherein a number of clusters generated in the clustering of the plurality of training transactions depends on the plurality of training transactions.

8. The method according to claim 1, wherein the indication whether a training transaction is fraudulent or genuine is disregarded in the clustering of the plurality of training transactions.

9. The method according to claim 1, wherein the plurality of training transactions are financial transactions.

10. A non-transitory computer-readable storage medium storing instructions thereon which, when executed by a computer, cause the computer to perform a method, the method comprising:

selecting a subset of training transactions from a plurality of training transactions, wherein each training transaction comprises an indication whether the training transaction is fraudulent or genuine, the selected subset of training transactions being used for training a machine-learning model, the machine-leaning model being used for classifying transactions as either fraudulent or genuine, wherein selecting a subset of training transactions includes clustering the plurality of training transactions into a plurality of clusters based on a similarity measure;

determining the number of clusters to be used in the clustering of the plurality of training transactions based on the plurality of training transactions, wherein the number of clusters to be used in the clustering of the plurality of training transactions is determined by using an iterative process that is performed over a range of numbers of clusters resulting in a plurality of results each comprising a plurality of clusters;

comparing at least one property of the plurality of clusters of the plurality of results, wherein the number of clusters to be used is based on a trade-off between intra-cluster variance and inter-cluster variance of the clustering of the plurality of training transactions; and selecting a result and the associated number of clusters for which the at least one property is improved compared to other results of the plurality of results;

selecting a subset of training transactions from the plurality of training transactions, wherein the method for selecting the subset of training transactions includes selecting a first proportion of the training transactions of a cluster of training transactions for the subset of training transactions in response to the cluster including at least one fraudulent training transaction;

selecting a second proportion of the training transactions of a cluster of training transactions for the subset of training transactions in response to the cluster being free of fraudulent training transactions, the second proportion being less than the first proportion, wherein the training transactions that are selected for the second proportion of the subset of training transactions are selected based on a proximity of said training transactions to a centroid of the respective cluster;

providing the selected subset of training transactions for training a machine-learning model, wherein the selected subset of training transactions improves accuracy in classifying transactions as either fraudulent or genuine, increases the amount of useful information and reduces the number of data points used for training, and provides a reduced training set that contains a high variety of transaction types that leads to highly discriminative information for effective modeling, and operating a fraud detection system using the trained machine-learning model to classify a transaction as either fraudulent or genuine.

11. An apparatus comprising circuitry, the circuitry being configured to:

select a subset of training transactions from a plurality of training transactions, wherein each training transaction comprises an indication whether the training transaction is fraudulent or genuine, the selected subset of training transactions being used for training a machine-learning model, the machine learning model being be used for classifying transactions as either fraudulent or genuine, wherein the circuitry for selecting the subset of training transactions is further configured to cluster the plurality of training transactions into a plurality of clusters based on a similarity measure;

determine the number of clusters to be used in the clustering of the plurality of training transactions based on the plurality of training transactions, wherein the circuitry for determining the number of clusters to be used in the clustering of the plurality of training transactions is further configured to use an iterative process that is performed over a range of numbers of clusters resulting in a plurality of results each comprising a plurality of clusters;

compare at least one property of the plurality of clusters of the plurality of results, wherein the number of clusters to be used is based on a trade-off between intra-cluster variance and inter-cluster variance of the clustering of the plurality of training transactions; and select a result and the associated number of clusters for which the at least one property is improved compared to other results of the plurality of results;

select a subset of training transactions from the plurality of training transactions, wherein the method for selecting the subset of training transactions includes select a first proportion of the training transactions of a cluster of training transactions for the subset of training transactions in response to the cluster including at least one fraudulent training transaction;

select a second proportion of the training transactions of a cluster of training transactions for the subset of training transactions in response to the cluster being free of fraudulent training transactions, the second proportion being less than the first proportion, wherein the training transactions that are selected for the second proportion of the subset of training transactions are selected based on a proximity of said training transactions to a centroid of the respective cluster;

provide the selected subset of training transactions for training a machine-learning model, wherein the selected subset of training transactions improves accuracy in classifying transactions as either fraudulent or genuine, increases the amount of useful information and reduces the number of data points used for training, and provides a reduced training set that contains a high variety of transaction types that leads to highly discriminative information for effective modeling, and operate a fraud detection system using the trained machine-learning model to classify a transaction as either fraudulent or genuine.

* * * * *